Feb. 21, 1967 W. F. DUSTERHOFT 3,305,284

TELEPHONE WALL CABINET

Filed Sept. 10, 1965 2 Sheets-Sheet 1

INVENTOR

WILLIAM F. DUSTERHOFT

BY Ross W. Campbell

ATTORNEY

TELEPHONE WALL CABINET

Filed Sept. 10, 1965 2 Sheets-Sheet 2

INVENTOR

WILLIAM F. DUSTERHOFT

BY Ross W. Campbell

ATTORNEY

United States Patent Office 3,305,284
Patented Feb. 21, 1967

3,305,284
TELEPHONE WALL CABINET
William F. Dusterhoft, 8383 Geddes Road, Ypsilanti, Mich. 48197
Filed Sept. 10, 1965, Ser. No. 486,468
1 Claim. (Cl. 312—242)

The present invention relates to telephone wall cabinets and more particularly to a telephone wall cabinet arranged to present a telephone selectively for use on either side of a wall.

An object of the invention is to provide an improved telephone wall cabinet for providing access to a single telephone selectively from either side of the wall.

Another object of the invention is to provide in a telephone wall cabinet arranged to provide access to a single telephone from either side of the wall improved means for giving silence and privacy to the user of the telephone.

Still a further object of the invention is to provide in a telephone wall cabinet improved means for removing the telephone from access.

The above and other objects of the invention which will later become apparent as the following description proceeds, are attained by the present invention, a preferred embodiment of which has been illustrated, by way of example only, in the accompanying drawings, forming a part of this specification in which like characters are employed to designate like parts throughout the same, and wherein.

Figure 1:
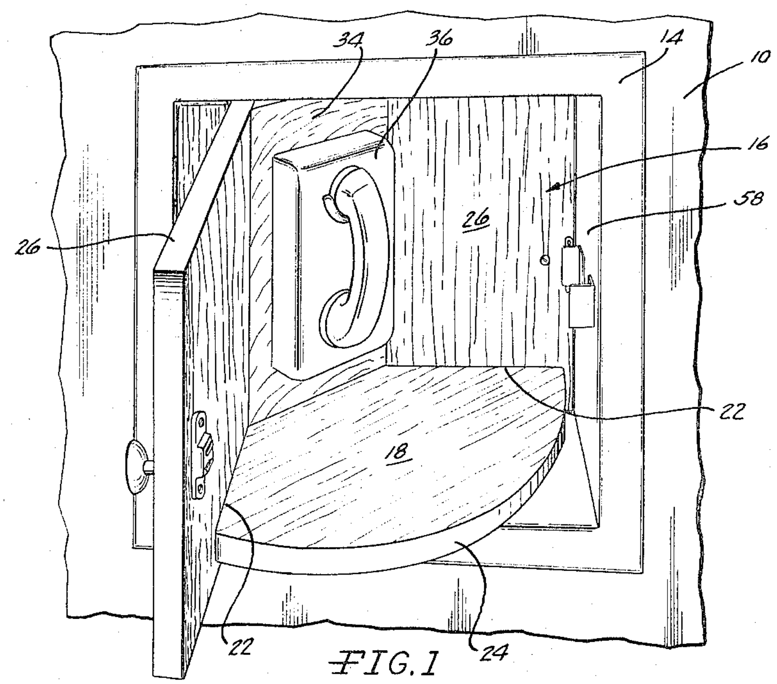
FIGURE 1 is a perspective view of my improved telephone wall cabinet from the front with the telephone presented for use.
Figure 2:
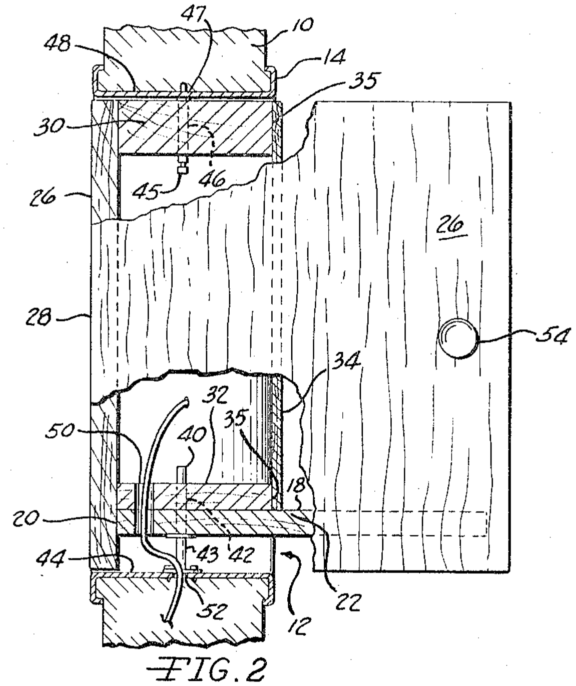
FIGURE 2 is a side elevational view of my invention, partially in section, taken along line 2—2 of FIGURE 3.

Referring now more particularly to the drawings, the reference character 10 designates a wall or partition, such as an interior wall separating a room from the outdoors, and the reference character 12 generally designates a rectangular aperture provided in said wall or partition to receive my invention.

I provide a rectangular frame 14 preferably formed of rolled metal and arranged to be securely mounted within aperture 12 by conventional means, such as screws or the like (not shown), and to open upon both sides of wall 10.

I further provide a novel swinging assembly generally indicated at 16 and arranged to be pivotally swung within frame 14. Swinging assembly 16 includes a horizontally disposed, quadrant-shaped platform 18, formed of metal or preferably wood, and having a vertex 20, a pair of straight, radial sides 22, 22 of equal length and meeting at a right angle at the vertex, and a curved edge 24, extending between sides 22, 22, and formed upon the arc of a circle about the vertex as a center and having a radius equal to the length of said sides.

A pair of vertical, rectangular doors 26, 26 are mutually joined by a joint 28 at a right angle at the vertex of platform 18, and are secured slightly above their lower edges to the radial sides 22, 22 of the platform, by screws, glue, or the like (not shown).

A horizontal, triangular upper brace 30 is similarly secured between and flush with the upper ends of doors 26, 26 at joint 28, and a similar lower brace 32 is secured between the doors atop platform 18. A rectangular backboard 34 is then similarly secured to the exposed, forward edges 35, 35 of braces 30 and 32, above platform 18, at an angle of substantially 135° with each door 26, 26 so as to be disposed at a right angle to an imaginary vertical plane bisecting platform 18. Backboard 34 is provided with appropriate conventional means and an aperture (not shown) to mount thereon a conventional telephone instrument 36 and to permit connection thereto of a conventional telephone wire 38 through the backboard. While I have shown backboard 34 as being vertically disposed, resting upon platform 18, and extending horizontally to the inner sides of each door 26, 26, it is to be understood that it may be supported by braces 30 and 32 in a rearwardly tipped position, or in spaced relationship to the platform or doors, or both.

A lower pivot pin 40 extends slideably downward through a bore 42 in lower brace 32 and platform 18 rearwardly of backboard 34, is pivotally received within a bearing 43 mounted upon the lower side 44 of frame 14, and is arranged so that it may be disengaged from bearing by drawing it axially upward. A spring-loaded, retractable, upper pivot pin 45 is mounted upon upper brace 30, extends slideably upward through a bore 46 in the brace, and is pivotally received within an upper pivot pin aperture 47 in the upper side 48 of frame 14. Upper pivot pin 45 is arranged so as to be yieldingly retained by its spring in engagement with aperture 47 in upper side 48 of frame 14, but capable of being manually withdrawn downwardly so as to be disengaged from the aperture and frame. Pivot pins 40 and 45 form a vertical hinge axis for swinging assembly 16 upon the longitudinal midlines of lower and upper sides 44 and 48 of frame 14.

It will be noted that access to pivot pins 40 and 45 may be obtained by removing backboard 34, in order that the pins may be inserted or withdrawn so as to mount or remove swinging assembly 16 with respect to frame 14. In the alternative, an aperture may be provided within the backboard, behind and concealed by telephone instrument 36, of sufficient size to permit the insertion of a hand for the purpose of inserting and withdrawing the pivot pins.

Figures 3, 4, 5, 6, 7, 8:
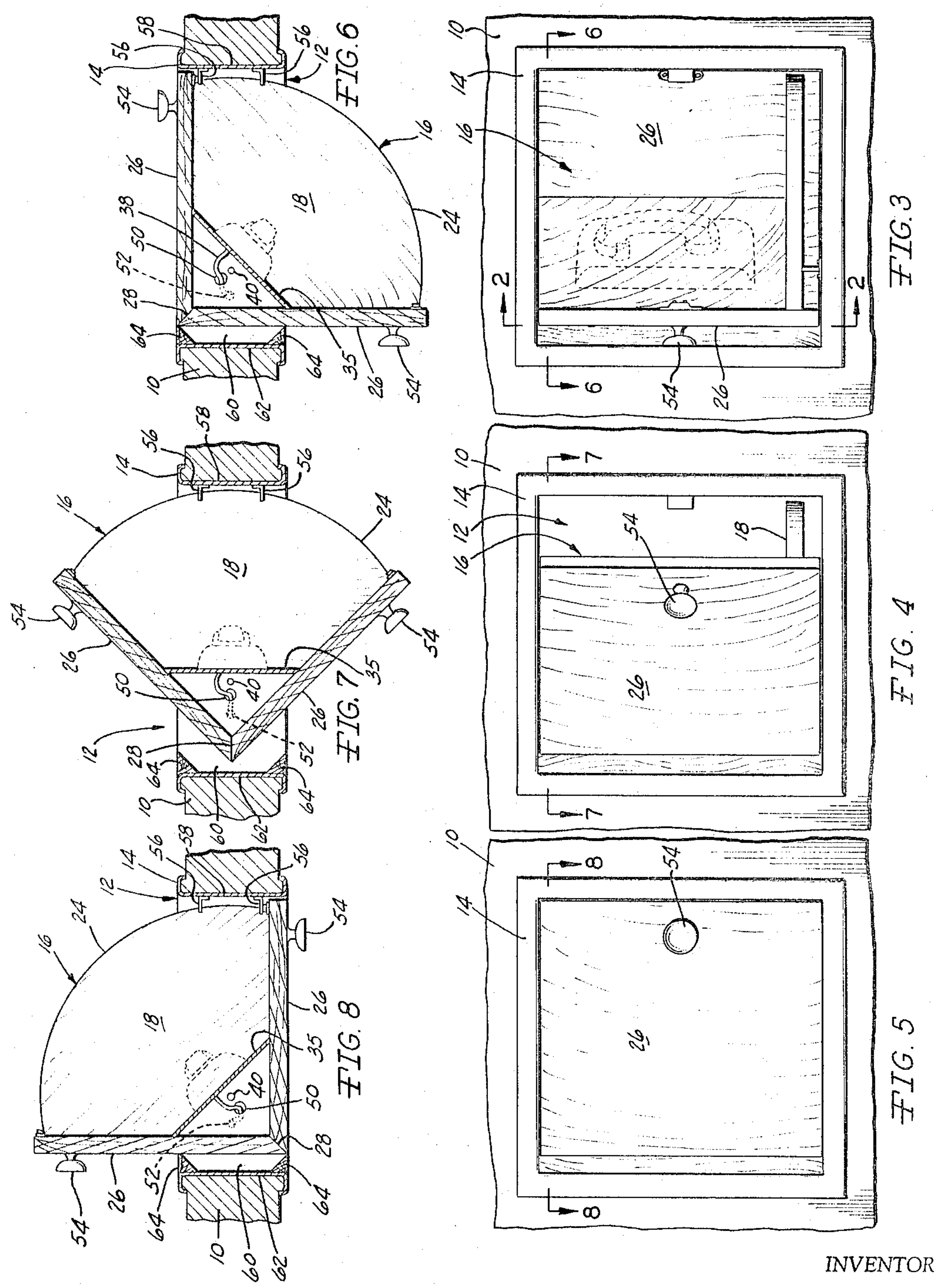
FIGURE 3 is a front elevational view of my invention with the cabinet open to present the telephone, shown in dotted lines, for use.
FIGURE 4 is a front elevation of my invention showing the cabinet partially closed.
FIGURE 5 is a front elevational view of my invention showing the cabinet completely closed.
FIGURE 6 is a sectional view taken along line 6—6 of FIGURE 3.
FIGURE 7 is a sectional view taken along line 7—7 of FIGURE 4.
FIGURE 8 is a sectional view taken along line 8—8 of FIGURE 5.

A second bore 50 is drilled downwardly through lower brace 32 and platform 18, preferably rearward of pivot pin 40, and a second aperture 52 is drilled through the lower wall 44 of frame 14, to permit passage of telephone wire 38 therethrough. It will be observed that, as best shown in FIGURE 7, bore 50 preferably lies within an imaginary vertical plane bisecting platform 18 and aperture 52 preferably lies upon the longitudinal midline of lower side 44 of frame 14, so as to minimize twisting movement of wire 38 when swinging assembly 16 is swung with respect to the frame.

A pair of handles 54, 54 are affixed to the outer side of each door 26, 26, respectively, opposite joint 28, to enable a user to draw the door toward him and hence to swing assembly 16 in his direction so as to present telephone instrument 36 for use. Latch means, such as a pair of magnetic latch assemblies 56, 56, are mounted upon the sidewall 58 of frame 14 opposite hinge pins 40 and 45 and are arranged to retain each door 26, 26 flush with frame 14 when it is closed, respectively, by swinging assembly 16 in the appropriate direction.

It will be noted that, as best shown in FIGURES 1, 6, 7, and 8, joint 28 traverses the arc of a circular curve about the axis of pivot pins 40 and 45 as a center when assembly 16 is swung within frame 12, and that a space 60, which must be provided to allow clearance between joint 28 and the sidewall 62 of frame 14 nearest the pivot pins, will present a small gap between the sidewall and that door 26 which extends outwardly and perpendicular to the frame when opened. To conceal space 60 I provide a pair of vertical filler strips 64, 64, preferably of triangular cross-section, which are screwed, glued, or otherwise supported by conventional means against sidewall 62 between upper and lower sides 44 and 48 of frame 14 and which fill the gaps between the sidewall and doors when the doors are respectively closed.

In operation, with swinging assembly 16 pivotally mounted on pivot pins 40 and 45 within frame 14, telephone instrument 36 is presented for use by the occupant of a room by opening the nearest door 26, thus swinging assembly 16 about the pivot pins until further movement is stopped by closure of the opposite door 26 against its respective latch assembly 56. The nearest door 26 will then extend outwardly into the room, toward the user, at a right angle to wall 10, and telephone instrument 36 will be presented for use, as best shown in FIGURE 1. Platform 18 is formed of sufficient size, and backboard 34 is positioned rearwardly thereon a sufficient distance, so that the receiver of telephone instrument 36 may be removed and rested upon the platform when desired, or so that a telephone directory may be kept thereon, or both.

To present the telephone for use by a person on the other side of wall 10, as the occupant of an adjoining room services by the same telephone or a person outside of the building in case where wall 10 is an exterior wall, such other person simply opens the other door 26, or the person in the first room simply closes the door 26 nearest to himself, thereby swinging assembly 16 in an opposite direction, through the positions shown consecutively in FIGURES 3, 4, and 5 and correspondingly in FIGURES 6, 7, and 8, until further movement is halted by the opposite latch assembly 56.

It will be noted that a single telephone instrument may thus be used selectively by the occupants of two adjoining rooms, or occupants of a building and persons outside of the building. Further, by reason of the automatic closure of door 26 on the opposite side of telephone instrument 36, the party using the telephone instrument is assured silence and privacy.

The invention has particular application in dormitories and rooming houses where for economy it may be desired to have the occupants of two adjoining rooms utilize a single telephone. Further, by removing handle 54 from one door 26 and providing an appropriate locking device for said door, the invention may also be utilized in places where use of the telephone by the occupant of a room is to be prevented or controlled, from the opposite side of wall 10, if such is desired, as in the case of jail cells or in commercial applications, such as lumber yards, where it may be desired to have a telephone available on the outside of a building during business hours but withdrawn and locked safely within the building at night to prevent unauthorized use or vandalism.

It is to be understood that the form of the invention herewith shown and described is to be taken as a preferred embodiment of the same and that resort may be had to various changes in construction without departing from the scope of the subjoined claim.

What is claimed is:

In a rectangular frame mounted in an aperture in a wall separating two rooms and opening upon said rooms, means for supporting and selectively presenting a telephone instrument to each of said rooms and for simultaneously closing said aperture on the other side of said telephone instrument, comprising:

- a quadrant-shaped, horizontal platform having a vertex and a pair of radial sides;
- a pair of vertical doors mutually joined at a right angle at the vertex of said platform and secured near their respective lower edges to the radial sides of said platform;
- a horizontal, triangular, upper brace secured to the inner sides of said doors at their joint and flush with the upper edges thereof;
- a horizontal, triangular lower brace supported upon said platform and secured to the inner sides of said doors at their joint and near the lower edges thereof;
- a vertical backboard adapted to support a telephone instrument and secured to said braces above said platform, between said doors, near and spaced from said vertex, at substantially a right angle to a plane bisecting said platform;
- a lower pivot pin supported upon and extending slideably downward through said lower brace and platform rearward of said backboard and pivotally received within bearing means mounted upon the lower side of said frame;
- a spring-loaded, retractable upper pivot pin mounted upon and extending slideably upward through said upper brace rearward of said backboard and pivotally received within a pivot pin aperture in the upper side of said frame;
- said pivot pins, bearing means, and pivot pin aperture being in alignment to form a vertical pivot axis rearward of said backboard upon which said platform, doors, braces, and backboard are disposed to swing horizontally within said frame;
- latch means for releasably retaining each door in its respective closed position;
- and a pair of vertical filler strips supported against the sidewall of said frame nearest said pivot axis, extending between the upper and lower sides of said frame, and filling the pair of spaces between said sidewall and each door when either of said doors is in closed position.

References Cited by the Examiner

UNITED STATES PATENTS 2,363,816 11/1944 Svikhart ---------- 312—238 X

FOREIGN PATENTS 54,824 2/1927 Denmark.

OTHER REFERENCES

Modern Furniture, middle of page 92, by Mario Dal Fabro, copyright 1949, published by Reinhold Publishing.

CLAUDE A. LE ROY, *Primary Examiner.*

CHANCELLOR E. HARRIS, *Assistant Examiner.*